Nov. 18, 1958  E. T. PLATZ ET AL  2,861,139
BUS DUCT PLUGS WITH COVER OPERATED
RETRACTABLE CONTACT FINGERS
Filed Jan. 31, 1957  5 Sheets-Sheet 2

INVENTORS
WILLIAM H. FRANK
JOHN A. HERRMANN
BY ELWOOD T. PLATZ
Ostrolenk, Faber,
Gerb & Soffen
ATTORNEYS Nov. 18, 1958

E. T. PLATZ ET AL

2,861,139

BUS DUCT PLUGS WITH COVER OPERATED
RETRACTABLE CONTACT FINGERS

Filed Jan. 31, 1957

INVENTORS
WILLIAM H. FRANK
JOHN A. HERRMAN
ELWOOD T. PLATZ
BY
ATTORNEYS

Nov. 18, 1958

E. T. PLATZ ET AL

2,861,139

BUS DUCT PLUGS WITH COVER OPERATED
RETRACTABLE CONTACT FINGERS

Filed Jan. 31, 1957

INVENTORS
WILLIAM H. FRANK
JOHN A. HERRMANN
BY ELWOOD T. PLATZ

ATTORNEYS

Nov. 18, 1958 E. T. PLATZ ET AL 2,861,139
BUS DUCT PLUGS WITH COVER OPERATED
RETRACTABLE CONTACT FINGERS
Filed Jan. 31, 1957 5 Sheets-Sheet 5

INVENTORS
WILLIAM H. FRANK
JOHN A. HERRMANN
ELWOOD T. PLATZ
BY
ATTORNEYS

United States Patent Office 2,861,139
Patented Nov. 18, 1958

2,861,139

BUS DUCT PLUGS WITH COVER OPERATED
RETRACTABLE CONTACT FINGERS

Elwood T. Platz and William H. Frank, Detroit, and John A. Herrmann, Grosse Pointe Farms, Mich., assignors, by mesne assignments, to I-T-E Circuit Breaker Company, Philadelphia, Pa., a corporation of Pennsylvania Application January 31, 1957, Serial No. 637,575

21 Claims. (Cl. 200—50)

Our invention relates to bus duct plugs used with a bus duct distribution system and more particularly to duct plugs having retractable contact fingers and automatic controls for operating the shutter in the bus duct housing.

A bus duct distribution system is a means for distributing electrical energy within a localized area. The bus duct comprises a set of bus bars that are spaced and supported by insulators, with the conductors and insulators being enclosed in a housing so that the bus bars are protected from mechanical damage, and operating personnel do not contact the bus bars and receive electrical shocks. The bus bars are connected to a source of electrical energy. There are openings in the duct housing at regular intervals along its length to permit power to be tapped from the bus by means of bus duct plugs and conducted from the plugs to the load by a cable or suitable conductors.

At present the installation and removal of bus duct plugs from a live plug-in bus duct structure is a hazardous operation requiring the operator to follow a set procedure if he is to avoid electrical shock to himself or avoid damage to the equipment.

Our invention prevents live portions of the system from being accessible to the operator. This is achieved by fastening the plug to the duct while the duct shutter is closed, then opening the shutter and projecting the contact fingers into high pressure engagement with the bus bars. The sequence of opening the shutter and projecting the contact fingers is accomplished automatically. After this sequence, load switching is easily accomplished by means of a rotary control handle. During load switching the high pressure contact between the contact fingers and the bus bars is never relaxed.

While recent developments in the field of bus duct plugs provide means for projecting the contact fingers, the load switching operation affects the high pressure contact between the fingers and the bus bars. Nor do these recent developments provide means for automatically controlling the duct shutter.

Accordingly, a primary object of our invention is to provide a plug having positive acting high pressure contact disconnect fingers operable by the plug cover with the contact pressure between the fingers and bus bars being unaffected by load switching.

Another object of our invention is to provide means to automatically control the operation of the shutter on the plug-in bus duct housing by operation of the plug cover as the disconnect fingers are being projected from or withdrawn into the plug case.

A further object of our invention is to provide means to prevent load switching at times when the disconnect fingers are not in load current carrying engagement with the bus.

A still further object is to provide selective means for keeping the disconnect fingers retracted in the plug case while the plug cover is closed, making for ease of installation, transportation and storage.

Another object is to provide a means, selectively controllable externally of the plug case, whereby the conducting fingers may be retracted within the confines of the case without opening its cover.

Still another object is to provide means which will automatically de-energize the plug when the plug cover is open but with defeater means to permit "authorized" persons to make tests.

Another object is to provide means to prevent the plug from being removed from the duct unless the disconnect fingers have been retracted.

These and other objects of our invention will become apparent from the following description taken in connection with the drawings in which:

In the position of Figure 2, the duct shutter is open, the contact fingers projecting from the plug case, and the load switch "on."

In the position of Figure 3, the duct shutter is closed, the contact fingers retracted into the case, and the load switch "off."

In Figure 4 the contact fingers have been retracted by opening the line side cover.

In Figure 5 the contact fingers have been retracted with the line side cover closed.

In Figure 6 the contact fingers have been projected from the plug case by closing the line side cover.

In Figure 10, the conducting fingers are projected to contact the bus bars and the load switch is "on."

In Figure 11, the conducting fingers have been retracted with the cover closed,

In Figure 12, the conducting fingers have been retracted by opening the cover.

The embodiment illustrated is a three phase unit, but our invention may be used equally well in a single phase system or a multi-phase system having any number of phases. All that need be done is to provide a set of contact fingers, a set of cooperating contacts, and electrical connections therebetween for each phase, and arrange them so that the components of all the phases are ganged for simultaneous operation.

Referring to Figures 1–8, as a setting for the operation of bus duct plug 70, it will be described as being affixed to a plug-in duct having in its housing 71 tapped holes 108 (Figure 8) and an opening 107 aligned above the bus conductors 92. A shutter 100 rides in guide channels 101, which are affixed to the inside surface of the duct housing 71, and serves to cover the duct opening 107 when the plug 70 is not connected to the duct housing. For automatic control of the shutter 100, the operation of which will be subsequently explained, a two-width slot 106, is cut in the duct housing 71 and hole 105 is cut in the shutter.

In order to mount the plug 70 to the duct housing 71, mounting flanges 94 extend from each end of the plug case 93 in a plane with the bottom of the case 93. Clearance holes 95 are cut in the flanges 94 and align with tapped holes 108 of the duct housing 71. Screws, not shown, are passed through the clearance holes 95 and mated with the tapped holes 108 to secure the plug 70 to the duct housing 71. Legs 56 running the length of the plug 70 straddle the duct housing 71 to aid in locating the plug 70 on the duct housing 71 and offer mechanical strength to the connection.

Figure 7:
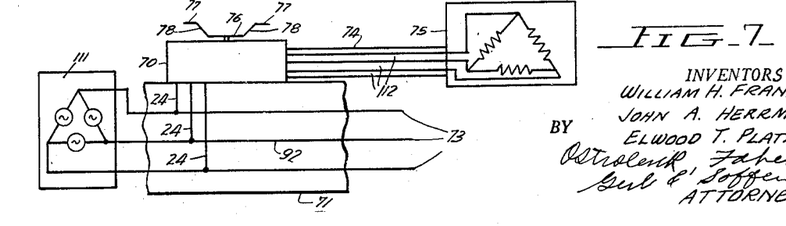
Figure 7 is a diagrammatic presentation of a complete circuit from a load to a generator by means of a plug-in bus duct.

Figure 7 shows the completed electrical path, from a load 75 to the generator 111, through cable 74 which is connected between the load 75 and the plug 70. The conducting or contact fingers 24 project from the plug 70 and contact the bus bars 92 which in turn are connected to the source of electrical energy 111.

Figure 6:
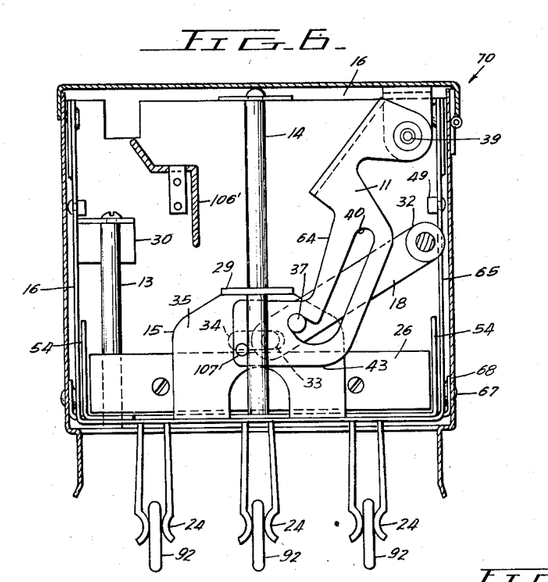

Engagement of the contact fingers 24 with the bus bars 92 is shown to be by friction (Figure 6). However, to those skilled in the art, it will be apparent that this contact may be made by butting the contact fingers 24 against the bus bars 92 as do the fingers 222 and bus bars 230 of Figure 9.

The electrical path through the plug 70 is completed by passing the cable 74 through the knockout 110 (Figure 2) in the end of the case 93. Each cable conductor 112 is connected to a load terminal 88 of the load switch 90. Pigtails 89 are connected from the line terminals 87 of the load switch 90 to the terminals 94 on the contact fingers 24. The electrical path is completed when the load switch 90 is "on" and its cooperating contacts are engaged.

The plug 70 comprises a case 93 having a line side cover 62 pivotally mounted thereon by means of hinges 85 and a load side cover 63 pivotally mounted to case 93 by means of hinges 86. The load side cover 63 overlaps strip 57 which is secured to the underside of line side cover 62. Hole 73 is cut in load cover 63 as a clearance hole for the body of voiding screw 58 which mates with tapped hole in the strip 57. The screw 58, normally being in place, will cause both covers to open simultaneously. But when screw 58 is removed, the load side cover 63 may be opened without the line side cover 62 also opening thus permitting a maintenance man to trouble shoot a partially energized plug 70. However, the load side cover 63 may never be closed without also closing line side cover 62 since attempting to close load side cover 63 when line side cover 62 is opened will cause load cover 63 to strike strip 57 mounted to line cover 62 and close the line side cover 62.

An externally operated control handle 20 is pivotally mounted on the outside of the load side cover 63 by means of rivet 82 or other similar means. Handle 20 consists of a lower portion 76 and two raised portions 77 joined to the lower portion 76 by inclined portions 78. Holes 79 are in portions 77 and permit load switching from a distant point by means of an extension.

Figure 1:
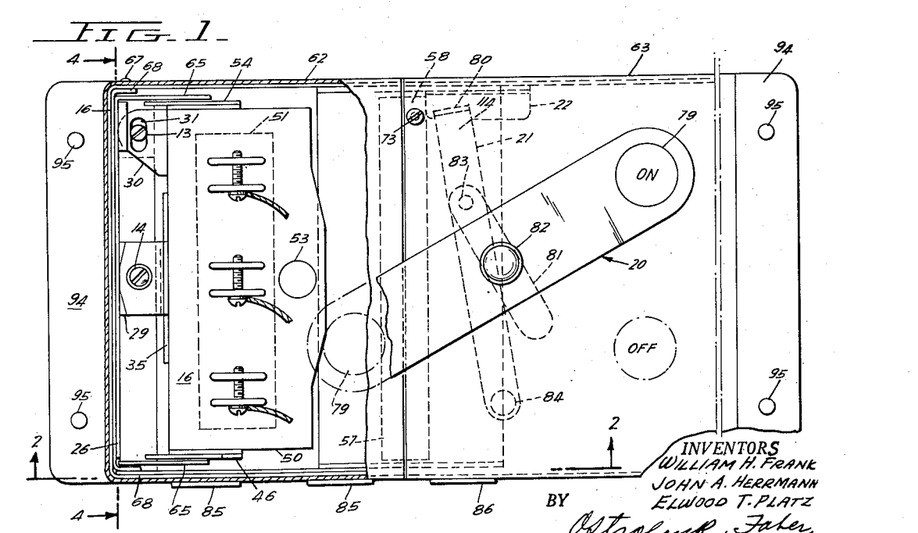
Figure 1 is a plan view of the plug with the line side cover removed.
Figure 2:
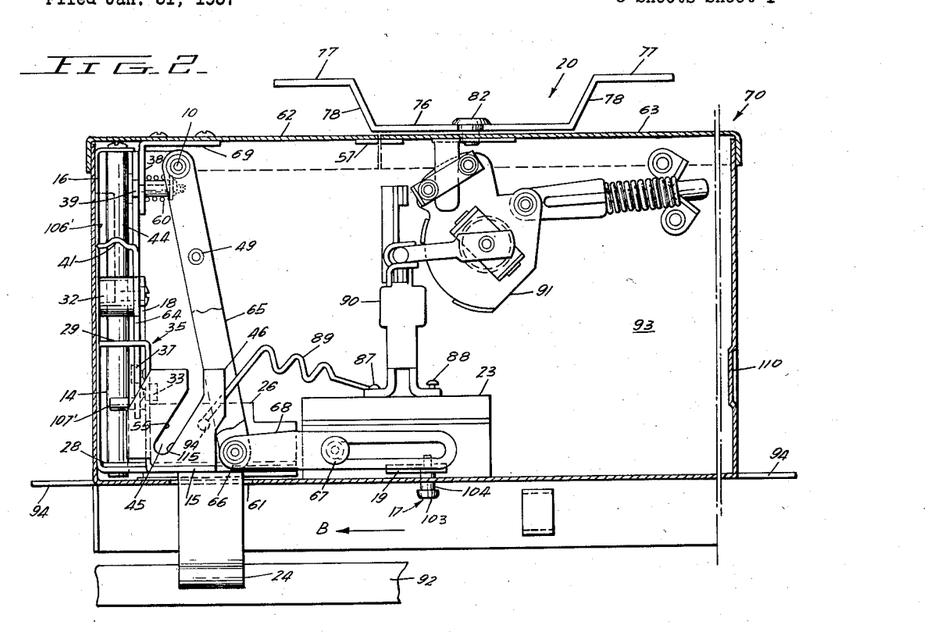
Figures 2 and 3 are sections taken through line 2—2 of Figure 1 looking in the direction of arrows 2—2.

As best seen in Figure 1, link 81 is pivotally mounted to the inside of cover 63 by means of rivet 82 and moves in unison with handle 20. Link 81 is connected to member 21 by rivet 83. One end of member 21 pivots on post 84 which projects from the inside of cover 63. Projecting downwardly from the other end of member 21 is a finger 80 which engages the load switching mechanism 91, which is of a conventional rotary type. Rotating the handle 20 from "off" to "on" positions moves the finger 80 from right to left in Figure 2 causing the operating mechanism 91 to bring the cooperating contacts into engagement. The cooperating contacts are part of the load switch 90, which may be a disconnect contact head of a type disclosed by Patent No. 2,302,849 electrically connecting the load terminal 88 to the line terminal 87 of load switch 90. Interlock clip 22 projects from the side of the plug case 93 and serves to prevent the cover 63 from opening while the load switch 90 is "on." If an attempt is made to open the cover 63 while the load switch 90 is "on," the top surface 114 of member 21 will strike the interlock clip 22 and opening the cover will thus be prevented.

Contact fingers 24 are secured to an insulating block 26 attached to the contact holder 15. The contact holder 15 has flanges 28 and 29 with holes for journaling its vertical movement on the contact holder bearing 14 which is rigidly supported on the contact holder frame 16. The contact holder 15 also has a flange 30 with an oblong hole 31 for journaling in the contact holder guide 13, which is also rigidly supported by the contact holder frame 16, to prevent rotational movement of the contact holder 15 on its guide 14.

Contact holder lever 18 is pivotally mounted at one end to the post 32 which is secured to the contact holder frame 16. The opposite end of lever 18 has a pin 33 which extends operatively into the horizontal slot 34 in the vertical flange 35 formed from the base of the contact holder 15. A pin 37 projects from lever 18 intermediate the ends thereof in a direction opposite to pin 33.

When the lever 18 is swung upward from its position shown in Figure 6, through angle 36 (Figure 4), the pin 37 will rise to a position 37a and pin 33 to 33a causing the contact holder 15 to rise vertically at right angles to the bottom of the plug case 93 the distance between points 33 and 33a to its position 15a. The lever bracket 69 is attached to the line side cover 62 and has a downwardly extending flange 38 with a hole 39' for receiving pin 39 upon which the actuator lever bearing 11 is pivotally mounted. When the cover 62 is swung open through 180°, the actuator lever bearing 11 will swing to position 39a.

Figure 4:
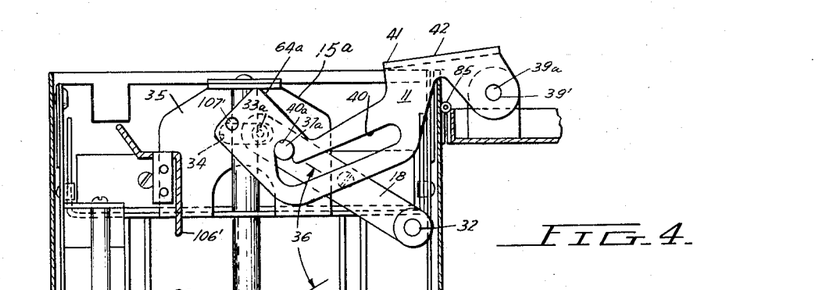
Figures 4, 5 and 6 are sections taken through line 4—4 of Figure 1 looking in the direction of arrows 4—4.
Figure 5:
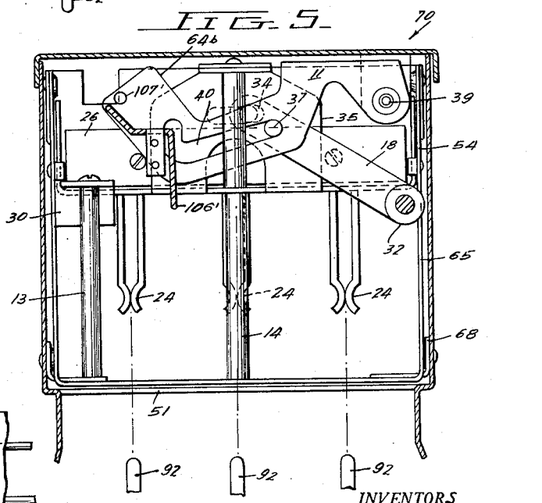

The upper end of the contact actuator 64 is journalled to the actuator lever bearing 11 and has an L-shaped slot 40 for operative engagement with pin 37 of contact holder lever 18. When the cover 62 is swung open through 180°, the contact holder 15 will rise to position 15a and the actuator 64 will move to position 64a (Figure 4).

When in position 64a, the left end of actuator 64 may be raised when the operator pulls up with his finger in the notch 41 in flange 42 of actuator 64. This will permit the pin 37 in its position 37a to rise in the portion 40a of slot 40 so that the cover 62 can be closed without pushing down on the contact holder lever 18. The contact actuator will now assume the position 64b (Figure 5) and the contact holder 15 will stay in position 15a with its contacts 24 completely withdrawn into the case 93. When the contact actuator 64 is in the position 64b (Figure 5), a post 107' projecting therefrom rests on 106' which is secured to the contact holder frame 16. This serves to remove the weight of the contact holder 16 from the contact actuator 64 and to positively support the conducting fingers 24 in their retracted position when the cover is closed.

A torsion spring 60 is mounted on the actuator lever bearing 11 and reacts between the bracket 69 and the contact actuator 64 to bias same in a downwardly direction. Therefore, when the cover 62 is reopened with the actuator 64 in position 64b re-engagement with pin 37 will be automatic for subsequent operation of the cover 62 in the usual manner with contact fingers 24 passing through opening 61 in the bottom of the plug 70, and in alignment with duct opening 107, to engage the bus bars 92. The extension 43 on the contact actuator 64 is provided as a guide between the flange 35 of the contact holder 15 and the contact holder bearing 14.

The upper end of the shutter actuator levers 65 are pivotally connected at 10 to flanges 44 formed from opposite sides of the contact holder frame 16 and their lower ends are operatively connected by pivots 66 to shutter actuator 68 which are guided with respect to the case 93 by shoulder rivets 67 attached to the inside of the case 93. The shutter actuators 68 are connected to bridge 19 which has a removable stud 17 threaded thereto at its midpoint or on the longitudinal center of the duct 71. Stud 17 is received by hole 105, in the shutter 100 and serves as the shutter control device. Shutter stud 17 has a narrow body 104 which rides in slot 106 in the duct housing. At one end of the slot 106 is a large opening 102 which receives the large head 103 of the shutter stud 17. The narrow slot 106 captures the large head 103 when the shutter 100 is not completely closed and serves as an interlock to prevent removal of the plug 70 from the duct housing 71 while the shutter 100 is opened.

Figure 8:
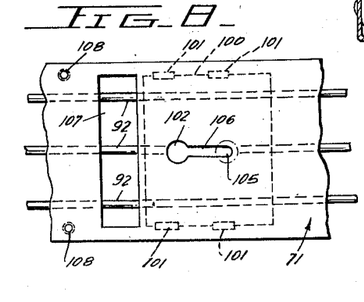
Figure 8 is a plan view of a section of the duct, including a shutter, to which the plug will be affixed.

Hole 53 in the bottom of the plug 70 is a clearance hole to permit the plug 70 to be mounted on a plug-in duct having a shutter arrangement other than that illustrated in Figure 8. At this same time shutter stud 17 is removed.

Figure 3:
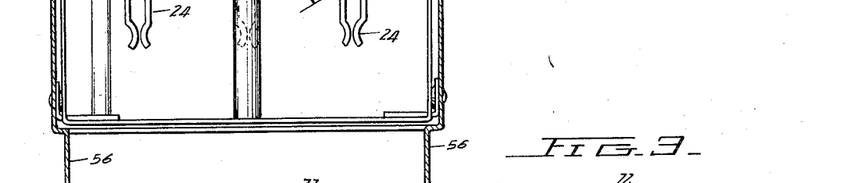

The shutter actuator levers 65 include inwardly projecting pins 49. Upwardly formed flanges 46 at each end of the contact holder 15 have slots 45 with vertical portions 54 and inclined portions 55 cut therein. The space relation between pins 49 and portions 54 of slots 45 is such that when the contact holder 15 is raised, the pins 49 will merely enter the slot portions 54 when the duct disconnect fingers 24 just recede into the case 93. Subsequent raising of the contact holder 15 will force the pins 49 along the edges 115 of the inclined portions 55 of slots 45. This movement will pivot the shutter actuator levers 65 clockwise about pin 10 and cause the shutter on the duct housing 71, which is operated by the shutter stud 17, to move in the direction of arrow B to the closed position as shown in Figure 3.

*Summary of operation (Figures 1–8)*

(1) Beginning with a plug 70 affixed to a bus duct 71, the plug covers 62 and 63 being opened, and voiding screw 58 being in place so that covers 62 and 63 move in unison. This condition as illustrated in Figure 4.

(2) Closing the covers 62 and 63 will cause the shutter stud 17 to move in a direction opposite to arrow B and open the shutter 100. At the same time the contact fingers 24 will be projected into the duct 71 to engage the bus bars 92.

(3) Load switching is accomplished by operation of rotary handle 20 with interlock members 21 and 22 preventing cover opening while the load switch is "on."

(4) With the rotary handle 20 in the "off" position, the covers 62 and 63 may be opened to the position illustrated in Figures 3 and 4 with the contact fingers 24 now retracted and the duct shutter 100 closed.

(5) The covers 62 and 63 may be closed without projecting the contact fingers 24 or opening the duct shutter 100 by lifting tab 41 as you begin to close the covers 62 and 63.

(6) By removing voiding screw 58, the load side cover 63 may be opened without also opening the line side cover 62 so that electrical measurement of the bus may be taken. At the same time load cover 63 is prevented from closing by member 57 unless the line cover 62 is first closed.

Figures 9–12 illustrate the use of a cover operated toggle mechanism 200 for the control of the conducting fingers 222. The cover 251 of plug case 250 is pivotally mounted at hinges 252. Upper link 204 of the toggle 200 is pivoted at one end to the rivet 205 which is supported by angle clip 206, attached to the cover 251. The other end is pivoted at the knee 212 of the toggle 200 to which one end of lower link 208 is also pivoted. The other end of lower link 208 is connected to pin 209 which is supported by U-shaped bracket 210 mounted on the top surface of the contact holder 211 by screw 210'.

Figure 10:
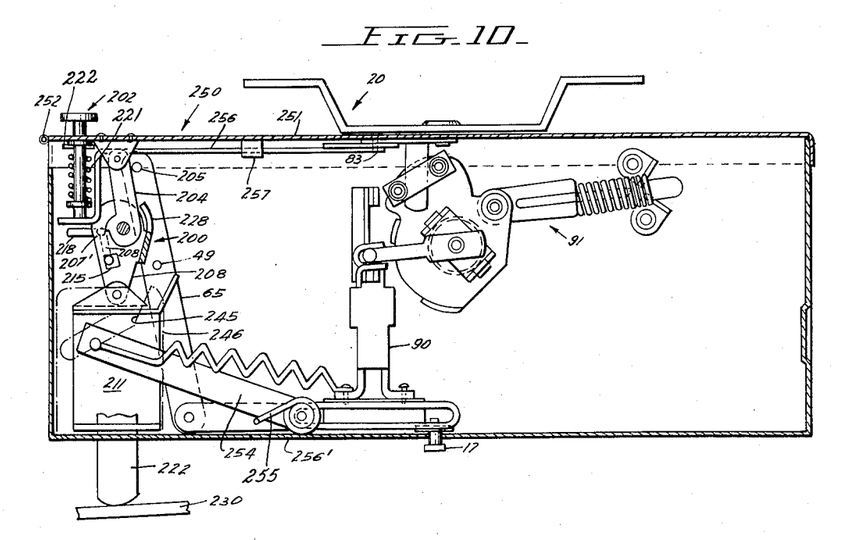
Figures 10, 11 and 12 are side elevations of the embodiment of Figure 9 with the side of the case cut away.
Figure 11:
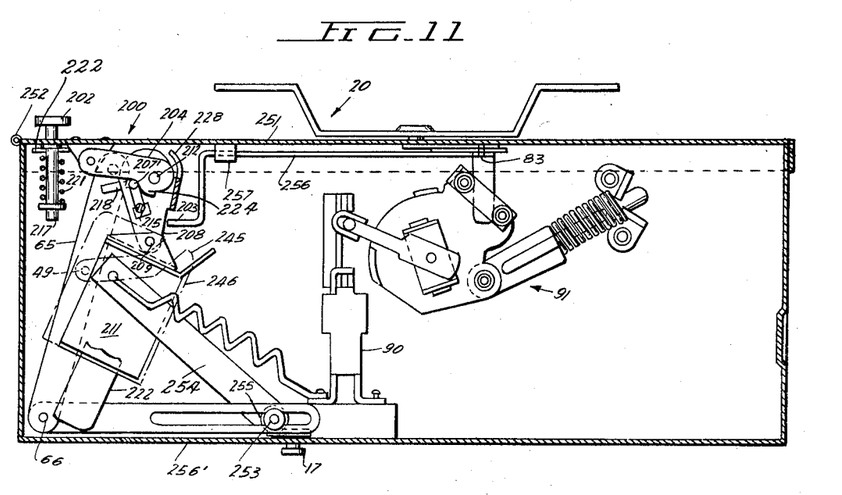
Figure 12:
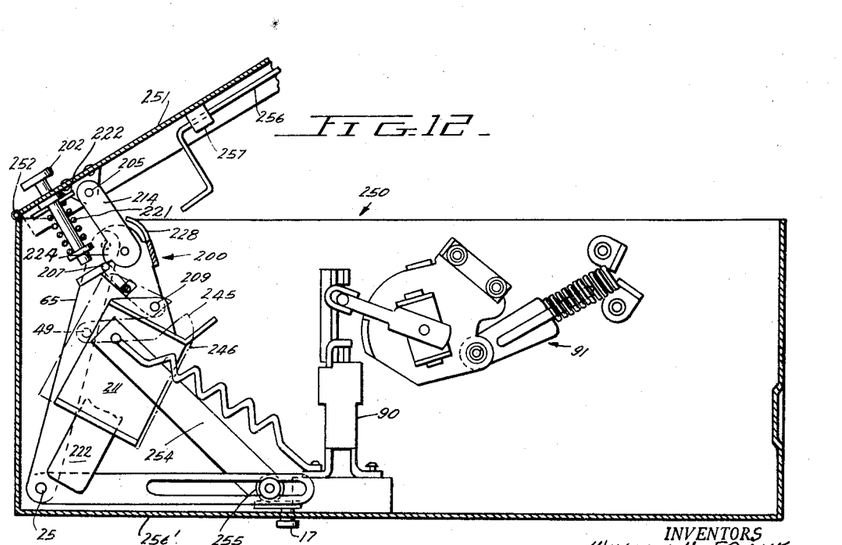

Lower link 208 is a U-shaped member which supports the toggle lock 213. The toggle lock 213 is partially U-shaped having a lower leg 214 which extends through slots 215 in the sides of lower link 208. The upper leg 216 of toggle lock 213 is journalled in hole 217' of the lower link 208. A torsion spring 208a biases the lower leg 214 clockwise about upper leg 216 as seen in Figures 10–12, with the travel of lower leg 214 limited by the size of slots 215.

A half-moon section 207 is formed in the central portion of upper leg 216. Toggle lock 213 also has an actuating projection 218 extending from upper leg 216 to be engaged by the end 217 of control plunger 202 should it be desired to retract the conducting fingers 222 when the cover 251 is closed, as will be hereinafter fully explained. Plunger 202 is journalled by holes in bracket 220 and is biased away from engagement with actuating projection 218 by compression spring 221 which bears against the bracket 220 and projection 222 of plunger 202.

Contact holder 211 is pivotally mounted to plug case 250 at posts 253 by means of arms 254. Torsion springs 255 wound around posts 253 bear against arms 254 and the bottom 256' of the case 250 to bias the contact holder 211 upwardly to travel in an arcuate path about posts 253.

The control handle 20 is mounted on the cover 251 and controls the operation of load switch 90 through switching mechanism 91 as previously explained. A cover interlock (not shown) is included. The cover interlock may be of the type formed by members 22 and 114 of Figure 1. Interlock lever 256, journalled in guide member 257, is operatively connected to the control handle 20 as at pin 83 of Figure 2.

Shutter control is accomplished in the same manner as previously explained in the description of Figures 1–8 except that cam slot 245 of flanges 246, which engage pins 49 of shutter actuator levers 65, must be differently shaped than cam slots 45 of flanges 46 since contact holder 211 travels an arcuate path while contact holder 15 travels a linear path. Shutter actuator levers 65 have been omitted from Figures 10–12 to more clearly illustrate the operation of the toggle mechanism 200.

Figure 9:
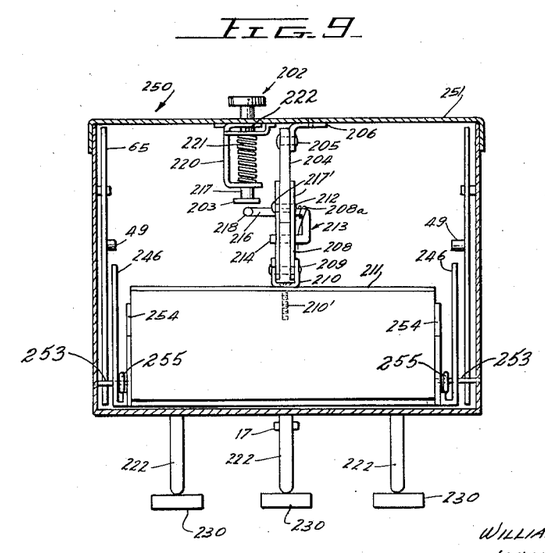
Figure 9 is an end view, with the end of the case cut away, of another embodiment of our invention wherein a toggle mechanism is employed to operatively connect the conducting fingers to the plug cover.

The embodiment of Figures 9–12 operates in the following manner. As seen in Figures 9 and 10, the conducting fingers 222 are projected from the plug case 200 into butt contact with bus bars 230 and the cooperating contacts (not shown) of the load switch 90 are in engagement. The tip 203 of interlock lever 256 is positioned between tip 217 of plunger 202 and the actuating projection 218 of the toggle lock 213. Contact holder 211 is biased upwardly by springs 255 but the knee 212 of toggle mechanism 200 is prevented from breaking to the right since projection 224 of upper link 204 is latched on the rounded surface 207' of the half-moon section 207. Thus, the toggle mechanism 200 is locked in a straight position.

When the control handle 20 is rotated to the "off" position interlock lever 256 is moved to the right so that its tip 203 will no longer block plunger 202. By depressing plunger 202, its tip 217 engages actuating projection 218 and rotates the half-moon section 207 counterclockwise to free projection 224 and unlatch the toggle 200 so that it will break with the knee 212 thereof moving to the right under the influence of springs 255 thus allowing the conducting fingers 222 to be retracted within the confines of the case 250, as seen in Figure 11.

In order to again project the conducting fingers 222 out of the case 250, the cover 251 is first pivoted open about hinges 252 (Figure 12). This straightens the toggle 200 and latches projection 224 on the rounded portion 207' of the half-moon 207 to lock the toggle 200 and form a rigid connection between pins 205 and 209. Clockwise rotation of upper link 204 about the knee 212 is limited by the central portion 228 of U-shaped lower link 208. Since the cover 251 is now operatively connected to the contact holder 211 by a rigid connection, the closing of cover 251 will force the contact holder 211 downward against the force of the biasing springs 255.

As long as the control handle 20 is in its "off" position, the cover 251 may be opened and closed. Opening the cover 251 retracts the fingers 222 because of the rigid connection between the cover 251 and the contact holder 211 formed by the locked toggle mechanism 200, and, as previously explained, closing the cover will project the conducting fingers 222.

In the foregoing we have described our invention only in connection with preferred embodiments thereof. Many variations and modifications of the principles of our invention within the scope of the description herein are obvious. Accordingly, we prefer to be bound not by the specific disclosure herein, but only by the appending claims.

We claim:

1. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening.

2. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position.

3. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison.

4. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison; a first interlock means to defeat said ganging means and permit said load side cover section to open when the line side cover section is closed but to prevent closing of said load side cover section until said line side cover section is being closed simultaneously with the closing of said load side cover section.

5. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison; a first interlock means to defeat said ganging means and permit said load side cover section to open when the line side cover section is closed but to prevent closing of said load side cover section until said line side cover section is closed.

6. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison; a first interlock means to defeat said ganging means and permit said load side cover section to open when the line side cover section is closed but to prevent closing of said load side cover section until said line side cover section is closed; a second interlock means to prevent said cover from being opened when said second control is in its said second position.

7. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison; a first interlock means to defeat said ganging means and permit said load side cover section to open when the line side cover section is closed but to prevent closing of said load side cover section until said line side cover section is closed; a second interlock means to prevent said cover from being opened when said second control is in its said second position; a fourth means to permit said finger to be retracted when said line side cover section is closed.

8. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison; a first interlock means to defeat said ganging means and permit said load side cover section to open when the line side cover section is closed but to prevent closing of said load side cover section until said line side cover section is closed; a second interlock means to prevent said cover from being opened when said second control is in its said second position; a fourth means to permit said finger to be retracted when said line side cover section is closed; said fourth means being comprised of a slot in said actuating member; a biasing means to bias said actuating member in a direction so that closing and opening said line side cover section will project and retract said finger.

9. A plug-in unit for a bus duct system comprising a plug housing, a first means, a second means and a first control; said first control being operatively and selectively connected to said first and said second means, said first means being comprised of a projecting member and a first positioning mechanism associated with said projecting member to position said projecting member; said projecting member positioned to engage an opening in a duct housing shutter; said plug housing being comprised of a case having an opening and a cover; said cover being comprised of a line side section and a load side section; said second means being comprised of a conducting finger in alignment opposite said case opening and a finger positioning mechanism associated with said conducting finger to retract said conducting finger through said case opening; said first control being comprised of an actuating member operatively mounted to said line side cover section and operatively connected to said finger positioning mechanism and positioned to operatively engage said first positioning mechanism so that opening of said line side cover section will retract said finger and position said projecting member to close a duct housing shutter and when closing said line side cover section said projecting member will open a duct housing shutter and said finger will be projected through said case opening; a third means being comprised of a pair of cooperating contacts and an operating mechanism; said operating mechanism being operatively associated with said cooperating contacts for moving said cooperating contacts into engaged and disengaged position; said second control being operatively mounted on said load side cover section; said second control having a first and a second position; said cooperating contacts being disengaged when said second control is in its said first position and engaged when said second control is in its said second position; ganging means to connect said load side cover section to said line side cover section to cause said sections to operate in unison; a first interlock means to defeat said ganging means and permit said load side cover section to open when the line side cover section is closed but to prevent closing of said load side cover section until said line side cover section is closed; a second interlock means to prevent said cover from being opened when said second control is in its said second position; a fourth means to permit said finger to be retracted when said line side cover section is closed; said fourth means being comprised of a slot in said actuating member; a biasing means to bias said actuating member in a direction so that closing and opening said line side cover section will project and retract said finger; said conducting finger being electrically connected to one of said cooperating contacts.

10. A plug-in unit for a multi-phase bus duct system being comprised of a first means, a second means, a first control operatively and selectively connected to said first and said second means, a third means, a second control operatively connected to said third means; a housing; said first means being comprised of a projecting member and a first positioning mechanism associated with said projecting member to position said projecting member; said projecting member positioned to engage an opening in the duct housing shutter, being comprised of a case having an opening and a covering; said second means being comprised of one conducting finger for each phase of the multi-phase; said conducting fingers being in alignment opposite said case opening and a positioning mechanism associated with said conducting fingers to project and retract said conducting fingers through said case opening; said first control being comprised of an actuating member operatively mounted to said cover and operatively connected to said finger positioning mechanism and positioned to operatively engage said first positioning mechanism so that merely opening said cover will retract said fingers and position said projecting member to close the duct shutter and when closing said cover said projecting member will open the duct shutter and said fingers will be projected through said case opening; said third means being comprised of a pair of cooperating contacts associated with each of said fingers and an operating mechanism associated with said pairs of cooperating contacts for moving said cooperating contacts into engaged and disengaged position; said second control being operatively mounted on said cover; said second control having a first and a second position; said cooperating contacts being engaged when said second control is in said second position and disengaged when said second control is in its said first position.

11. The combination of a plug-in bus duct and a duct plug; said plug-in bus duct being comprised of a housing having an opening, a bus bar mounted in said housing and insulated from said housing; a shutter mounted on said housing to cover said opening in said housing; said duct plug being comprised of a case having an opening and a cover, a pair of cooperating contacts, an operating mechanism associated with said cooperating contacts, a control handle operatively connected to said operating mechanism, a conducting finger operatively mounted in said plug case, means to position said finger into and out of said opening in said plug case; means to open and close said duct shutter; said latter means operatively connected to said plug cover so that by closing said cover said shutter is automatically opened and by opening said cover said shutter is automatically closed.

12. The combination of a plug-in bus duct and a duct plug; said plug-in bus duct being comprised of a housing having an opening, a bus bar mounted in said housing and insulated from said housing; a shutter mounted on said housing to cover said opening in said housing; said duct plug being comprised of a case having an opening and a cover, a pair of cooperating contacts, an operating mechanism associated with said cooperating contacts, a control handle operatively connected to said operating mechanism, a conducting finger operatively mounted in said plug case, means to position said finger into and out of said opening in said plug case; opening means to open said duct shutter; said means operatively connected to said plug cover so that by closing said cover said shutter is automatically opened; said plug being removably mounted on said duct housing; said opening means being comprised of a pin projecting from said case having a narrow body; said shutter having a hole to receive said pin; said duct housing having a narrow slot; said narrow body travelling in said narrow slot; an interlock to prevent said plug from being removed from said duct housing unless said shutter is closed.

13. The combination of a plug-in bus duct and a duct plug; said plug-in bus duct being comprised of a housing having an opening, a bus bar mounted in said housing and insulated from said housing; a shutter mounted on said housing to cover said opening in said housing; said duct plug being comprised of a case having an opening and a cover, a pair of cooperating contacts, an operating mechanism associated with said cooperating contacts, a control handle operatively connected to said operating mechanism, a conducting finger operatively mounted in said plug case, means to position said finger into and out of said opening in said plug case; opening means to open said duct shutter; said opening means operatively connected to said plug cover so that by closing said cover said shutter is automatically opened; said plug being removably mounted on said duct housing; said opening means being comprised of a pin projecting from said plug having a narrow body; said shutter having a hole to receive said pin; said duct housing having a stationary narrow slot; said narrow body travelling in said narrow slot; an interlock to prevent said plug from being removed from said duct housing unless said shutter is closed; said interlock being comprised of a wide head on said narrow body of said shutter pin, a wide opening at one end of said narrow slot to receive said wide body when said shutter is closed; movement of said wide head being blocked by said duct housing in every position except when said wide head is aligned with said wide opening at the end of said narrow slot in said duct housing.

14. A plug-in unit for a bus duct system comprising a plug housing and a first means; said plug housing comprising a case having an opening and a cover; said cover being movable to a closed and an opened position; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger automatically being projected through said case opening, when said cover is moved from said opened to said closed position, by motion transmitted from said cover.

15. A plug-in unit for a bus duct system comprising a plug housing, a first means and a first control; said first control operatively connected to said first means; said plug housing comprising a case having an opening and a cover; said cover being movable to a closed and an opened position; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger automatically being projected through said case opening when said cover is moved from said opened to said closed position; said first control being operatively and selectively engageable with said finger positioning mechanism and when engaged permitting said conducting finger to be positioned within the confines of said case when said cover is in said closed position.

16. A plug-in unit for a bus duct system comprising a plug housing; a first means and a first control; said first control operatively connected to said first means; said plug housing comprising a case having an opening and a cover; said cover being movable to a closed and an opened position; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger being projected through said case opening when said cover is moved from said opened to said closed position; said first control being operatively and selectively engageable with said finger positioning mechanism to permit said conducting finger to be positioned within the confines of said case when said cover is in said closed position; said finger positioning mechanism comprising a lock and a toggle mechanism having a straight and a broken position; said lock being operatively positionable to latch said toggle mechanism in said straight position when said conducting finger projects through said opening; said toggle mechanism also being in said straight position when said cover is open.

17. A plug-in unit for a bus duct system comprising a plug housing; a first means and a first control; said first control operatively connected to said first means; said plug housing comprising a case having an opening and a cover; said cover being movable to a closed and an opened position; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger being automatically projected through said case opening when said cover is moved from said opened to said closed position; said finger positioning mechanism comprising a lock and a toggle mechanism having a straight and a broken position; said lock being operatively positionable to latch said toggle mechanism in said straight position when said conducting finger projects through said opening and when said cover is in said opened position; said first control being operatively and selectively engageable with said lock; said first control when engaged with said lock permitting said toggle mechanism to move to said broken position and to permit said conducting finger to be positioned within the confines of said case when said cover is in said closed position; said first control being operable from without said case.

18. A plug-in unit for a bus duct system comprising a plug housing, a first means and a first control; said first control operatively connected to said first means; said plug housing comprising a case having an opening and a cover; said cover being movable to a closed and an opened position, said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger being projected through said case opening when said cover is moved from said opened to said closed position; said finger positioning mechanism comprising a lock and a toggle mechanism having a straight and a broken position; said lock being operatively positionable to latch said toggle mechanism in said straight position when said cover is in said open position; said first control being operatively and selectively engageable with said lock and when engaged permitting said toggle mechanism to move to said broken position and to permit said conducting finger to automatically be positioned within the confines of said case when said cover is in said closed position; said first control being operable from without said case; a second means being comprised of a projecting member and a second positioning mechanism operatively connected thereto; said projecting member positioned to engage an opening in a duct housing shutter; said finger positioning mechanism being operatively engageable with said second positioning mechanism to position said projecting member to open said shutter when said conducting finger is projected through said case opening and to position said projecting member to close said shutter when said conducting finger is within the confines of said plug housing.

19. A plug-in unit for a bus duct system comprising a plug housing; a first means and a first control; said first control operatively connected to said first means; said plug housing comprising a case having an opening and a cover; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger automatically being projected through said case opening when said cover is moved from said opened to said closed position; said first control being operatively and selectively engageable with said finger positioning mechanism and when engaged permitting said conducting finger to automatically be positioned within the confines of said case when said cover is in said closed position; a second means being comprised of a projecting member and a second positioning mechanism operatively connected thereto; said projecting member positioned to engage an opening in a duct housing shutter; said finger positioning mechanism being operatively engageable with said second positioning mechanism to position said projecting member to open said shutter when said conducting finger is projected through said case opening and to position said projecting member to close said shutter when said conducting finger is within the confines of said plug housing.

20. A plug-in unit for a bus duct system comprising a plug housing, a first means and a first control; said first control operatively connected to said first means; said plug housing comprising a case having an opening and a cover; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said conducting finger automatically being projected through said case opening when said cover is moved from said opened to said closed position; said first control being operatively and selectively engageable with said finger positioning mechanism and when engaged permitting said conducting finger to automatically be positioned within the confines of said case when said cover is in said closed position; said plug-in unit also comprising a pair of cooperating contacts disposed within said case and operable between an engaged and a disengaged position; a lever operatively connected to said cooperating contacts and movable to a first and a second position; said lever being in said first position when said cooperating contacts are disengaged and in said second position when said cooperating contacts are engaged; said lever when in said second position preventing said first control from engaging said finger positioning mechanism.

21. A plug-in unit for a bus duct system comprising a plug housing and a first means; said plug housing comprising a case having an opening and a cover; said cover being movable to a closed and an opened position; said first means being comprised of a conducting finger in alignment opposite said case opening and a finger positioning mechanism operatively connected to said conducting finger to move said conducting finger through said case opening; said cover being operatively connected to said finger positioning mechanism so that said conducting finger will be within the confines of said case when said cover is in said opened position; said positioning mechanism including means selectively operable to a first and a second position; said finger automatically being projected through said case opening, when said cover is moved from said opened to said closed position by motion transmitted from said cover when said means is in said first position; said finger remaining within the confines of said case when said means is in said second position and said cover is moved from said opened to said closed position.

References Cited in the file of this patent
UNITED STATES PATENTS 2,536,522     Wilson _________________ Jan. 2, 1951
2,786,908     Constantine et al. ________ Mar. 26, 1957